(12) United States Patent
Sugino et al.

(10) Patent No.: US 6,517,739 B2
(45) Date of Patent: Feb. 11, 2003

(54) FERULIC ACID DERIVATIVE, AND LIQUID CRYSTAL MATERIAL, CATION DETECTING ELEMENT, ANION DETECTING ELEMENT, ION CONDUCTING MATERIAL AND ELECTROLYTE, EACH USING THE FERULIC ACID DERIVATIVE

(75) Inventors: Takushi Sugino, Ikeda (JP); Yo Shimizu, Ikeda (JP); Hirosato Monobe, Ikeda (JP)

(73) Assignee: Agency of Industrial Science & Technology, Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 10/152,578

(22) Filed: May 23, 2002

(65) Prior Publication Data

US 2002/0137962 A1 Sep. 26, 2002

Related U.S. Application Data

(62) Division of application No. 09/750,171, filed on Dec. 29, 2000, now Pat. No. 6,441,217.

(30) Foreign Application Priority Data

Mar. 13, 2000 (JP) .................................. 2000-067913

(51) Int. Cl.$^7$ .................... C09K 19/12; C07C 255/50
(52) U.S. Cl. .................... 252/299.66; 558/414
(58) Field of Search .................... 558/414; 252/299.66

(56) References Cited

U.S. PATENT DOCUMENTS 6,441,217 B2 * 8/2002 Sugino et al. .............. 558/414

FOREIGN PATENT DOCUMENTS

| JP | 50-18621 | * | 2/1975 |
| JP | 51-45592 | * | 4/1976 |

OTHER PUBLICATIONS

The Merck Index, Twelfth Edition, p. 688 #4110.

* cited by examiner

*Primary Examiner*—Robert W. Ramsuer
*Assistant Examiner*—Ebenezer Sackey
(74) *Attorney, Agent, or Firm*—Oblon, Spivak, McClelland, Maier & Neustadt, P.C.

(57) ABSTRACT

A ferulic acid derivative represented by the general formula:

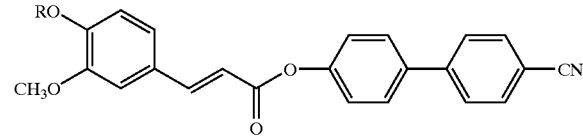

wherein R denotes a polyethylene glycol group, a crown ether group, or a azacrown ether group.

22 Claims, No Drawings

FERULIC ACID DERIVATIVE, AND LIQUID CRYSTAL MATERIAL, CATION DETECTING ELEMENT, ANION DETECTING ELEMENT, ION CONDUCTING MATERIAL AND ELECTROLYTE, EACH USING THE FERULIC ACID DERIVATIVE

This application is a divisional of Ser. No. 09/750,171 filed Dec. 29, 2000 now U.S. Pat. No. 6,441,217.

BACKGROUND OF THE INVENTION

1. Field of the Invention

This invention relates to a novel ferulic acid derivative and further to a liquid crystal material, a cation detecting element, an anion detecting element, an ion conducting material and an electrolyte, each using the ferulic acid derivative.

2. Description of the Prior Art

Phenols have heretofore been finding utility as an antioxidizing agent for addition to foodstuffs. In recent years, polyphenols have been attracting further attention on account of their ability to manifest an effect of repressing carcinogenesis. Furthermore, a group of researchers in Wakayama prefecture of Japan has developed a method for extracting and isolating ferulic acid, one of phenol derivatives, from the waste oil of rice bran inexpensively in a large amount. Therefore, the feasibility of commercializing the ferulic acid for utility in biochemical applications has been attracting attention from various quarters.

At the present stage, however, uses which can be expected to create large demands for the ferulic acid so produced have not been found. If a demand that can promises an effective utility of the ferulic add is found, the waste oil of rice bran, which has heretofore been treated as an industrial waste and consequently fated to be discarded, can be effectively utilized instead. As a result, the amount of industrial waste will be decreased and the development of inexpensive commercial products will be hoped for.

In view of the above, an object of this invention is to provide a novel ferulic acid derivative produced from ferulic acid as the raw material and exhibiting characteristic properties expected to find extensive utility and generate a great demand therefor. Another object of the invention is to provide a liquid crystal material, a metal ion-detecting element, an ion conducting material and an electrolyte which are formed respectively of the derivative.

To accomplish these objects, the present inventors have studied the design of a novel liquid crystal material with a view to effectively utilizing the ferulic acid. Specifically, they have tried design and configuration of an ion transfer material of a new type which, by introducing a group capable of coordinating with a metal ion to a hydroxyl group of ferulic add, can utilize the two-dimensional state of molecular aggregation to be formed by liquid crystal molecules in the state of liquid crystal.

SUMMARY OF THE INVENTION

A ferulic acid derivative according to this invention is a compound represented by the following general formula:

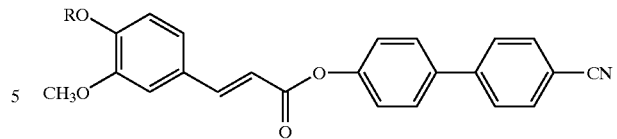

wherein R denotes a polyethylene glycol group, a crown ether group or an azacrown ether group.

A liquid crystal material according to this invention is a compound represented by the following general formula:

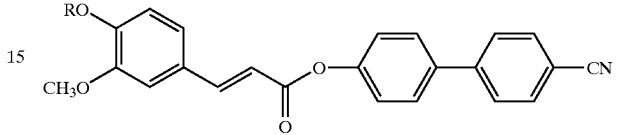

wherein R denotes a polyethylene glycol group, a crown ether group or an azacrown ether group.

A liquid crystal material according to this invention is formed by the coordination of at least one member selected from the group consisting of alkali metal ions, alkaline earth metal ions, and transition metal ions with a compound represented by the following general formula:

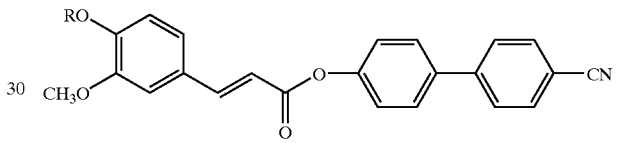

wherein R denotes a polyethylene glycol group, a crown ether group or an azacrown ether group.

This invention embraces a detecting element formed of the ferulic acid derivative mentioned above and intended to detect at least one species of cation selected from the group consisting of alkali metal ions, alkaline earth metal ions and transition metal ions.

This invention further embraces an anion detecting element formed by coordinating at least one member selected from the group consisting of alkali metal ions, alkaline earth metal ions and transition metal ions with the ferulic acid derivative mentioned above.

This invention also embraces an ion conducting material formed by coordinating at least one member selected from the group consisting of alkali metal ions, alkaline earth metal ions and transition metal ions with the ferulic acid derivative mentioned above.

This invention also embraces an electrolyte formed by coordinating at least one member selected from the group consisting of alkali metal ions, alkaline earth metal ions and transition metal ions with the ferulic acid derivative mentioned above.

The ferulic acid derivative or the liquid crystal material contemplated by this invention is a useful element applicable as a metal sensing material, an ion conducting material and an electrolyte.

The ferulic acid derivative of this invention, in a state not coordinated with any ion, is useful as a sensor (detecting element) for a cation (a metal ion, for example) and, in a state coordinated with a cation (a metal ion, for example), is useful as an anion sensor (anion detecting element).

DESCRIPTION OF THE PREFERRED EMBODIMENT

The general formula of the ferulic acid derivative according to this invention is as shown below.

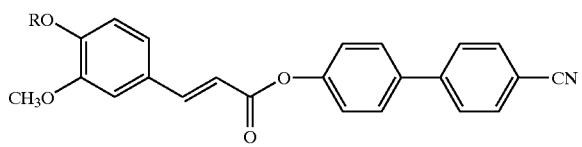

As a concrete example of the polyethylene glycol group denoted by R in the general formula of the ferulic acid derivative, the group which is represented by the formula, —$CH_2CH_2(OCH_2CH_2)_n$—OH (wherein n denotes an integer of 1 to 10), may be cited. In the formula, n denotes an integer of 1 to 10, preferably 1 to 6.

The crown ether group denoted by R in the ferulic acid derivative does not need to be particularly discriminated but is only required to be a group having a crown ether moiety. As preferred examples of the crown ether group, there may be cited the groups in which the number of oxygen atoms forming rings such as 12-crown-4, 15-crown-5, 18-crown-6, 24-crown-8, dibenzo 18-crown-6, dibenzo 24-crown-8, cryptand [2.2] and cryptand [2.2.2] is in the range of 3 to 8, the adjoining oxygen atoms have a crown ether structure concatenated with methylene, 1,2-phenylene or propylene, and the crown ether is connected either directly to the methylene, 1,2-phenylene or propylene forming the ring, or optionally via a spacer such as methylene or propylene to the phenolic hydroxyl group of a ferulic acid.

As concrete examples of the azacrown ether group represented by R in the ferulic acid derivative, the groups in which the oxygen atoms of the crown ether group are displaced with nitrogen atoms may be cited.

The ferulic acid derivative (I) can be produced, for example, in accordance with the following formula of reaction process.

<Formula of Reaction Process>

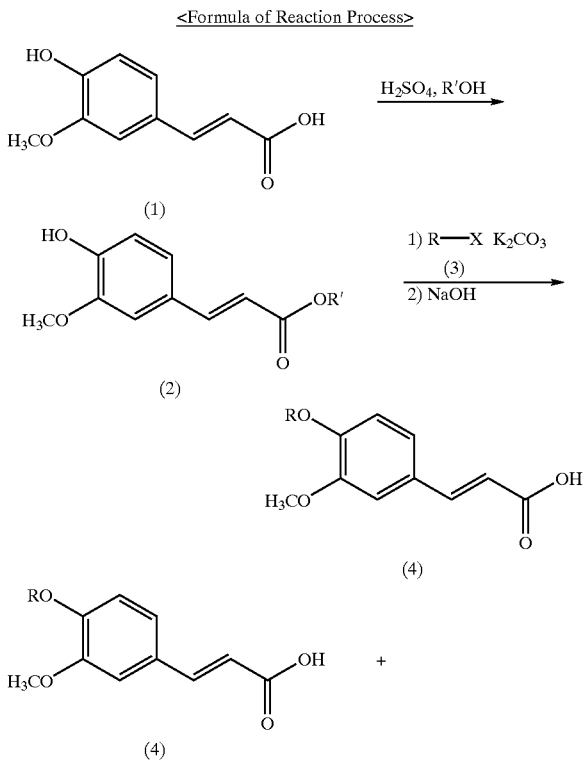

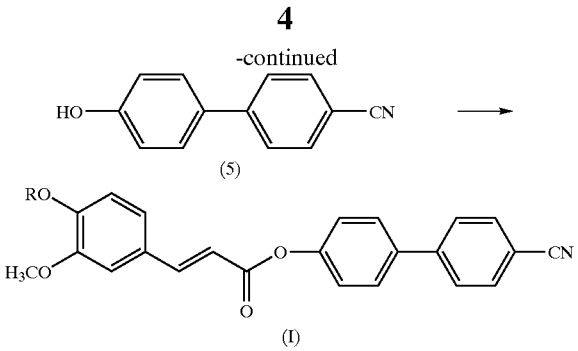

wherein R has the same definition as mentioned above, X denotes a leaving group, and R' denotes a methyl group, an ethyl group, a propyl group or a butyl group.

The ferulic acid (1) is left reacting in an alcohol such as methanol, ethanol, propanol or butanol with sulfuric acid at a temperature in the range of from normal room temperature to the refluxing temperature of the alcohol for a period in the range of 30 minutes to five hours to obtain an ester (2).

Then, one mol of the ester (2) is caused to react with about 1 to 2 mols of R—X (3) as refluxed in a solvent (such as 2-butanone) in the presence of a base such as potassium carbonate for a period in the range of 10 to 96 hours to effect introduction of the R group. Subsequently, the compound consequently obtained is left reacting in a solvent such as 2-butanone containing an aqueous 5% NaOH solution at a temperature approximating closely to normal room temperature for a period in the range of 1 to 24 hours to effect hydrolysis of ester and obtain a ferulic acid derivative (4) having the R group introduced.

One mol of the ferulic acid derivative (4), and about 1 to 2 mols of 4-hydroxy-4'-cyanobiphenyl (5), about 1 to 2 mols of a condensation agent such as dicyclohexyl carbodiimide (DCC) and a catalytic amount (about 10 mol %, for example) of dimethyl aminopyridine added thereto are left reacting in a solvent such as dichloromethane at a temperature in the range of from the temperature of the ice-cold water to the approximate temperature enabling the solvent to be refluxed for a period in the range of 1 to 24 hours to obtain the ferulic acid derivative (I).

As concrete examples of the leaving group denoted by X, halogen atoms such as chlorine atom, bromine atom and iodine atom, p-toluene sulfonyl group and methane sulfonyl group may be cited.

The ferulic acid derivative (I) of this invention, when R is a polyethylene glycol group or a crown ether group, forms a complex with an alkali metal ion (such as $Li^+$, $Na^+$, $K^+$ or $Cs^+$) or an alkaline earth metal ion (such as $Mg^{2+}$ or $Ca^{2+}$) or, when R is an azacrown ether group, forms a complex with a transition metal ion such as zinc ion, copper ion, nickel ion, iron ion, cobalt ion or manganese ion.

The ferulic acid derivative of this invention has been found to exhibit the property of liquid crystal. The newly introduced polyethylene glycol group, crown ether group or azacrown ether group is capable of perceiving and transporting various species of metal ions. Further, the state of liquid crystal affords a convenient field for the transportation of ion.

The substituent denoted by R has an oxygen atom or a nitrogen atom in the skeleton thereof enabled by the presence of an unshared pair of electrons therein to interact with a cation and has this cation consequently enabled to be moved (transported) to the R group of a compound adjoining thereto. Owing to the ability of the substituent to effect such movement (transportation) of ion as mentioned above, the complex having the ferulic acid derivative coordinated with an alkali metal ion, an alkaline earth metal ion or a transition metal ion is useful as an ion conducting material or an electrolyte. The complex particularly in the state of liquid crystal is useful as an ion conducting material or an electrolyte because it allows easy movement (transportation) of ion.

Thus, the present invention allows development of novel ion transferring materials and liquid crystal electrolytes that can be expected to create great demands.

The ferulic acid derivative and the liquid crystal material according to this invention can be utilized in the following applications.

For an ion sensor, for example, the given material can be dispersed in a macromolecular membrane to form an electrode. Then, for an ion conducting material or an electrolyte, there may be cited an element having inserted between electrodes of Au or ITO (indium tin oxide) a composition formed by adding a lithium trifluorosulfonic acid salt, for example, to a compound of the general formula (I). Further, the electrolyte can be used as the electrolyte in an ordinary primary cell or secondary cell.

The ferulic acid derivative of this invention, as described above, is produced by introducing into ferulic acid a long-chain ethylene oxide group convenient for the recognition and transportation of ion and, therefore, can be utilized as a liquid crystal material. Further, since the long-chain ethylene oxide group is capable of not only recognizing and transporting various species of metal ions but also allowing efficient transportation of ions in the two-dimensional state of molecular aggregation to be formed by the liquid crystal molecules in the state of liquid crystal, the ferulic acid derivative can be expected to find utility as an ion sensor which is important for medical analysis and ecological analysis and as an electrolyte in secondary cells for electric cars, note-size personal computers and portable telephones. The ferulic acid which is extracted and isolated inexpensively in a large amount from the waste oil of rice bran treated heretofore as industrial waste can be effectively utilized because it has the prospect of creating such extremely large demands as mentioned above. This utility, therefore, promotes the decrease of the amount of the industrial waste and the development of inexpensive commercial products.

Now, this invention will be described more specifically below with the aid of a working example.

EXAMPLE 1

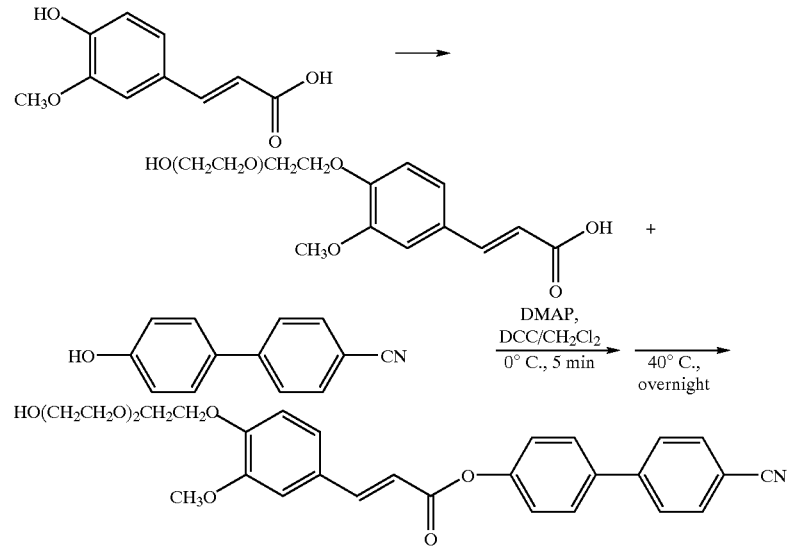

(1) Synthesis of Trioxyethylene-substituted Ferulic Acid

Methyl ester of ferulic acid was obtained (in a yield of 98%) by dissolving ferulic acid (6.45 g, 33.2 mmols) in methanol (120 ml) and refluxing the resultant solution together with concentrated sulfuric acid (2.4 ml) added thereto at 70° C. for 40 minutes. This methyl ester (6.8 g, 32.6 mmols), $HO(CH_2CH_2O)_2CH_2CH_2Cl$ (8.56 g, 50.8 mmols) and potasium carbonate (9.4 g, 68.0 mmols) were left reacting in 2-butanone (120 ml) as refluxed at 85° C. for 75 hours to obtain methyl ester of ferulic acid substituted with trioxyethylene (in a yield of 88%). The methyl ester of ferulic acid (2.01 g, 5.35 mmols) consequently obtained in a state substituted with trioxyethylene was left reacting in 2-butanone (15 ml) containing an aqueous 5% sodium hydroxide solution (75 ml) at room temperature for 15 hours to effect hydrolysis of the ester and produce ferulic acid substituted with trioxyethylene (in a yield of 46%). The structure of the resultant trioxyethylene-substituted ferulic acid was confirmed by the $^1$H-NMR.

(2) Synthesis of Ferulic Acid Derivative Having R Substituted with a Trioxyethylene Group In a flame-dried reaction vessel having an inner volume of 30 ml, trioxyethylene-substituted ferulic acid (400.5 mg, 1.23 mmols), 4-hydroxy-4'-cyanobiphenyl (343.9 mg, 1.76 mmols) and N,N-dimethylaminopyridine (DMAP) (24.1 mg, 0.197 mmol) were placed and were dissolved in 11 ml of dry dichloromethane. The resultant solution was kept stirred as cooled with ice, and a solution of dichlorohexyl carbodiimide (DCC) (360.4 mg, 1.75 mmols) in 5 ml of dichloromethane was slowly added dropwise to the stirred solution over a period of 5 minutes. The resultant reaction system was stirred at 0° C. for 5 minutes, deprived of the ice bath, allowed spontaneous temperature elevation, and then left reacting overnight at 40° C. After the reaction was completed, the reaction mixture was filtered to remove the precipitate, and the filtrate was washed with 1N hydrochloric acid (50 ml×3) and a saturated aqueous NaHCO$_3$ solution (50 ml×3) and extracted from dichloromethane (50 ml×3). The resultant extract was dried over MgSO$_4$ and then distilled under vacuum to expel the solvent. Consequently, 1.519 g of a light yellow solid was obtained. By refining this solid by silica gel column chromatography (dichloromethane/acetone=2/1→1/1→acetone alone), 0.590 g of a white crystal was obtained as the product aimed at.

$^1$H-NMR (500 MHz, CDCl$_3$)δ: 2.40 (brs, 1H, OH), 3.62 (t, 2H, J=4.3, 4.9 Hz, φ—OCH$_2$CH$_2$), 3.69–3.72 (m, 2H, CH$_2$CH$_2$OH), 3.73–3.77 (m, 4H, —OCH$_2$CH$_2$O—), 3.91 (S, 3H, CH$_3$O), 3.93 (t, 2H, J=5.5 Hz, φ—OCH$_2$CH$_2$), 4.24 (t, 2H, J=4.9 Hz, CH$_2$OH), 6.52 (d, 1H, J=15.9 Hz, CH=CHCOO), 6.94 (d, 1H, J=8.5 Hz, Ar$_{FA}$), 7.12 (d, 1H, J=1.8 Hz, Ar$_{FA}$), 7.16 (dd, 1H, J=8.5, 1.8 Hz, Ar$_{FA}$), 7.29 (d, 2H, J=8.6 Hz, Ar$_{CB}$), 7.83 (d, 1H, J=15.9 Hz, CH=CHCOO). IR (KBr): 3546, 3418, 3326, 3070, 2929, 2871, 2226, 1708 (cm$^{-1}$).

TEST EXAMPLE 1

When the ferulic acid derivative obtained in Example 1 was examined for behavior of phase transition under a polarizing microscope, it was observed to form a schlieren texture typical of the nematic phase. When the temperature was continuously lowered, a shape of streaks newly appeared in the texture of the nematic phase. As the temperature was further lowered, a dark visual field was obtained in the texture of the shape of streaks. The results of this observation clearly indicate that the ferulic acid derivative is a liquid crystal material.

What is claimed is:

1. A liquid crystal material represented by the general formula:

wherein R denotes a polyethylene glycol group, a crown ether group, or a azacrown ether group.

2. A liquid crystal comprising at least one member selected from the group consisting of an alkali metal ion, an alkaline earth metal ion and a transition metal ion coordinated with a ferulic acid compound represented by the formula:

wherein R denotes a polyethylene glycol group, a crown ether group, or an azacrown ether group.

3. The liquid crystal material according to claim 1, wherein R is a polyethylene glycol group.

4. The liquid crystal material according to claim 3, wherein said polyethylene glycol group is represented by the general formula:

—CH$_2$CH$_2$(OCH$_2$CH$_2$)$_n$—OH wherein n is an integer ranging from 1 to 10.

5. The liquid crystal material according to claim 3, wherein said polyethylene glycol group is represented by the general formula:

—CH$_2$CH$_2$(OCH$_2$CH$_2$)$_n$—OH wherein n is an integer ranging from 1 to 6.

6. The liquid crystal material according to claim 3, wherein said ferulic acid compound forms a complex with an alkali metal ion or an alkaline earth metal ion.

7. The liquid crystal material according to claim 1, wherein R is a crown ether group.

8. The liquid crystal material according to claim 7, wherein said crown ether group
   (a) is selected from the group consisting of 12-crown-4, 15-crown-5, 18-crown-6, 24-crown-8, dibenzo 18-crown-6, dibenzo 24-crown-8, and cryptand [2.2] and cryptand [2.2.2], wherein the number of ring-forming oxygen atoms ranges from 3 to 8;
   (b) contains adjoining oxygen atoms concatenated with methylene, 1,2-phenylene or propylene; and
   (c) is connected directly to the methylene, 1,2-phenylene or propylene forming the ring, or is connected via a methylene or propylene spacer to the phenolic hydroxyl group of the ferulic acid compound.

9. The liquid crystal material according to claim 7, wherein said ferulic acid compound forms a complex with an alkali metal ion or an alkaline earth metal ion.

10. The liquid crystal material according to claim 1, wherein R is an azacrown ether group.

11. The liquid crystal material according to claim 10, wherein said ferulic acid compound forms a complex with a transition metal ion.

12. The liquid crystal material according to claim 1, wherein said ferulic acid compound is a trioxyethylene-substituted ferulic acid compound.

13. The liquid crystal according to claim 2, wherein R is a polyethylene glycol group.

14. The liquid crystal according to claim 13, wherein said polyethylene glycol group is represented by the general formula:

—CH$_2$CH$_2$(OCH$_2$CH$_2$)$_n$—OH wherein n is an integer ranging from 1 to 10.

15. The liquid crystal according to claim 13, wherein said polyethylene glycol group is represented by the general formula:

—CH$_2$CH$_2$(OCH$_2$CH$_2$)$_n$—OH wherein n is an integer ranging from 1 to 6.

16. The liquid crystal according to claim 13, wherein said ferulic acid compound forms a complex with an alkali metal ion or an alkaline earth metal ion.

17. The liquid crystal according to claim 2, wherein R is a crown ether group.

18. The liquid crystal according to claim 17, wherein said crown ether group
   (a) is selected from the group consisting of 12-crown-4, 15-crown-5, 18-crown-6, 24-crown-8, dibenzo 18-crown-6, dibenzo 24-crown-8, and cryptand [2.2] and cryptand [2.2.2], wherein the number of ring-forming oxygen atoms ranges from 3 to 8;

(b) contains adjoining oxygen atoms concatenated with methylene, 1,2-phenylene or propylene; and (c) is connected directly to the methylene, 1,2-phenylene or propylene forming the ring, or is connected via a methylene or propylene spacer to the phenolic hydroxyl group of the ferulic acid compound.

19. The liquid crystal according to claim 17, wherein said ferulic acid compound forms a complex with an alkali metal ion or an alkaline earth metal ion.

20. The liquid crystal according to claim 2, wherein R is an azacrown ether group.

21. The liquid crystal according to claim 20, wherein said ferulic acid compound forms a complex with a transition metal ion.

22. The liquid crystal according to claim 2, wherein said ferulic acid compound is a trioxyethylene-substituted ferulic acid compound.

* * * * *